INVENTORS
BERNARD H. BERNSTEIN
DONALD F. MARTIN
BY Samuel Lindenberg

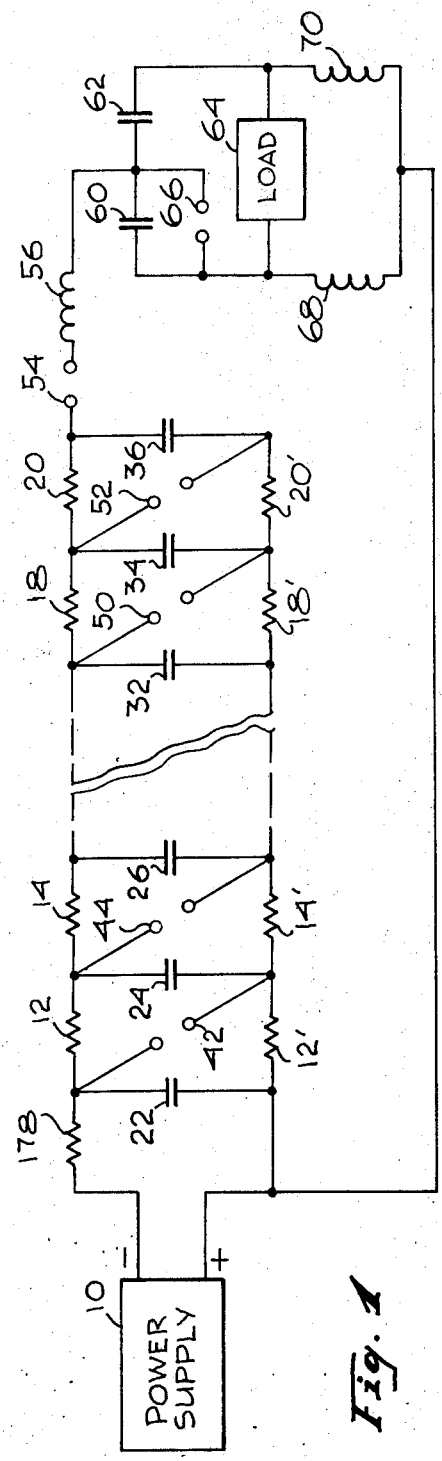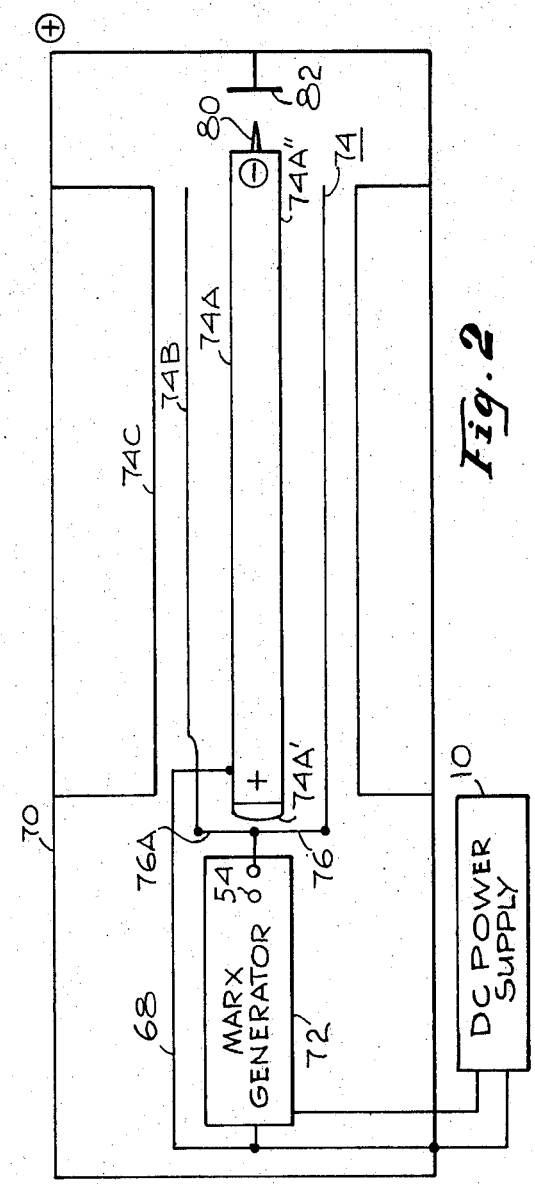

ATTORNEY

April 7, 1970 B. H. BERNSTEIN ET AL 3,505,533
SHIELDED HIGH VOLTAGE PULSE GENERATOR
Filed July 18, 1966 4 Sheets-Sheet 3
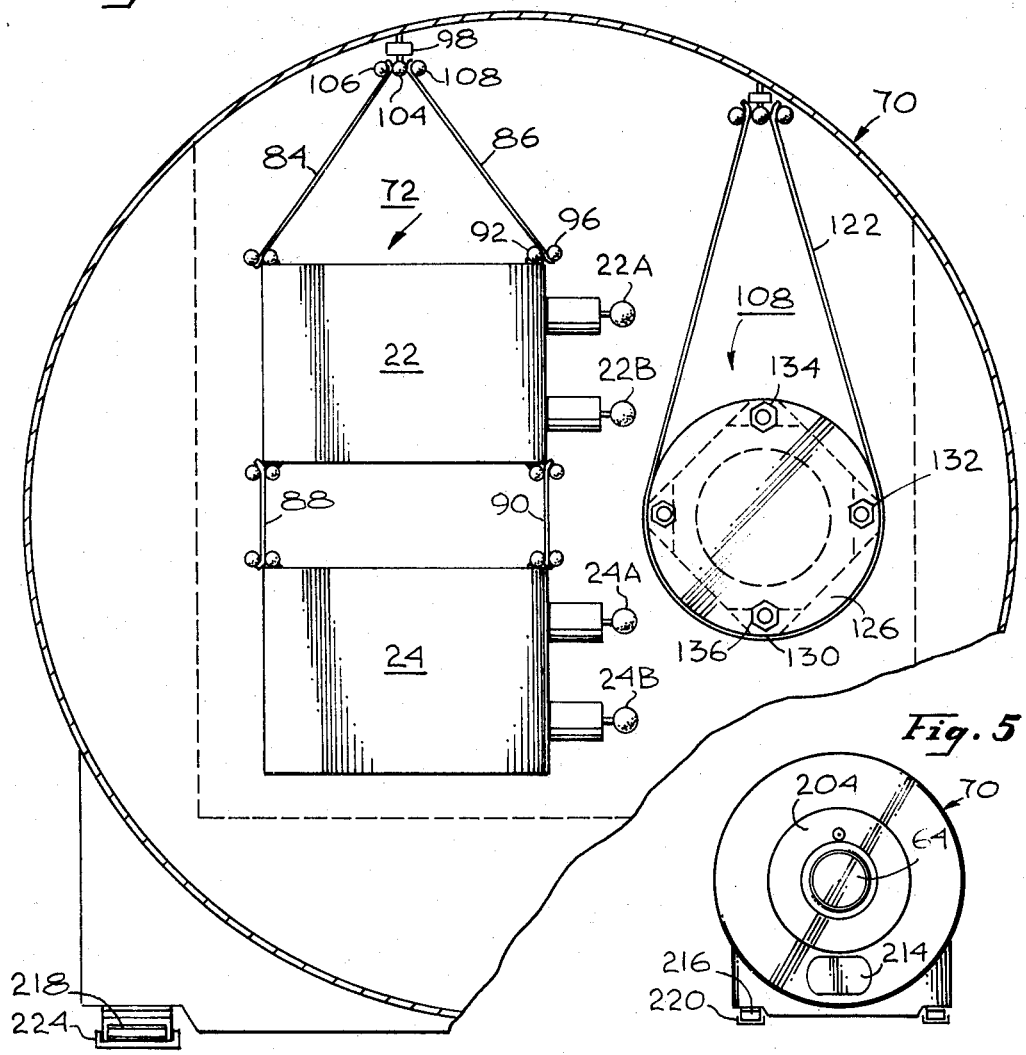
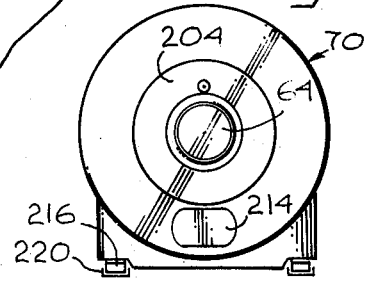
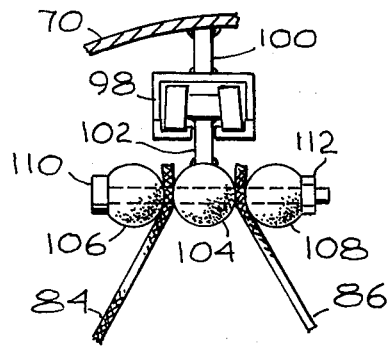
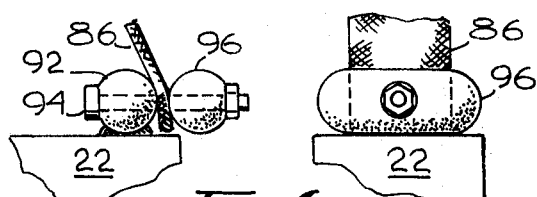
INVENTORS
BERNARD H. BERNSTEIN
DONALD F. MARTIN
BY Samuel Lindenberg
ATTORNEY

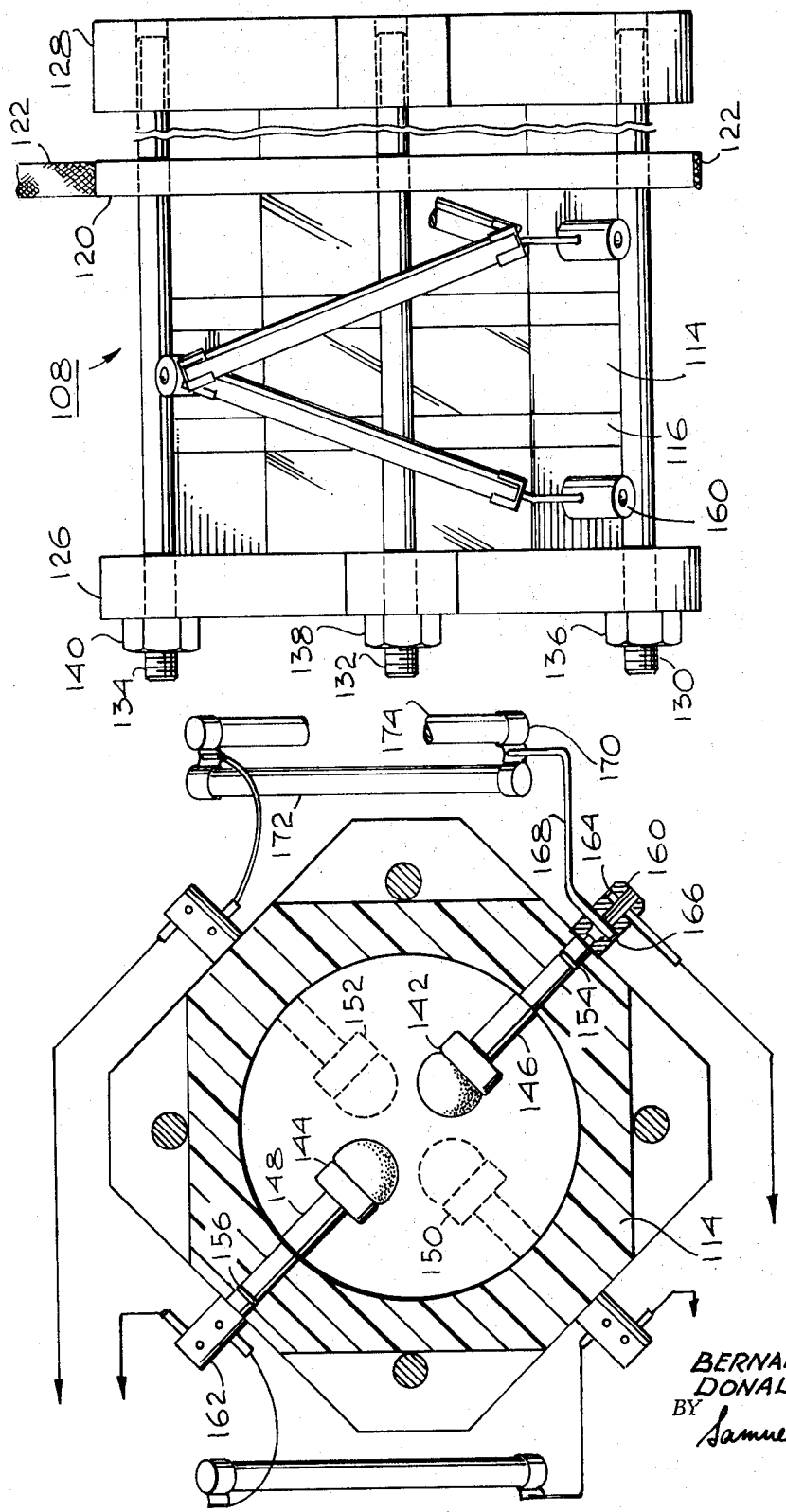

United States Patent Office 3,505,533
Patented Apr. 7, 1970

3,505,533
SHIELDED HIGH VOLTAGE PULSE GENERATOR
Bernard H. Bernstein, Livermore, and Donald F. Martin, Alamo, Calif., assignors to Physics International Company, Berkeley, Calif., a corporation of California
Filed July 18, 1966, Ser. No. 565,959
Int. Cl. H02m *3/06;* H03k *3/00;* H05k *9/00*
U.S. Cl. 307—110
12 Claims

ABSTRACT OF THE DISCLOSURE

The output of a Marx surge generator is employed to "resonance charge" a Blumlein type coaxial transmission line pulser, the output of which may be directly applied to an electron accelerator tube. The Marx generator structure as well as the Blumlein structure is suspended within a dielectric medium within an electromagnetic wave disturbance shielding tank by insulating straps of a nylon material. Preferably, the straps have sharp corners in cross-section to provide high insulation resistance.

---

Where high voltages are required for use with high voltage equipment, one type of high voltage generator which is employed, is known as a Marx surge generator. This generator comprises a large number of capacitors which are connected by resistors in parallel. The capacitors are charged in parallel through the resistors. Spark gaps are connected between the capacitors to shunt the resistors and to connect the capacitors in series. Thus, after the capacitors are charged up, the spark gaps are triggered so that the voltage on the capacitors is added in series and constitutes the output voltage of the Marx surge generator.

However, the output of a Marx surge generator is not suitable for driving apparatus such as high performance electron accelerator tubes. This difficulty is caused by the inherent internal inductance of the Marx generator which limits the rate of current rise in the load. To overcome this difficulty, the Marx generator may be used to "resonance charge" a coaxial transmission line pulser, the output of which may be directly applied to an electron accelerator tube. The transmission line pulser may be an adaption of a circuit developed by Blumlein and is known as a Blumlein generator. This circuit provides a 4 to 1 impedance step up and, therefore a voltage doubling may be obtained. The circuit also avoids the output complications of an ordinary transmission line pulser.

In combining a Marx generator with a Blumlein pulse generator, a switching problem arises. It is necessary to short circuit the central conductor of the coaxial line to the outer conductor in order to enable the Blumlein to operate and increase the voltage received from the Marx generator. Such switch operation must be instantaneous. The resistance and undue force of the switch must be as low as it is possible to get, otherwise the power available to the load is reduced. In view of the sizable current which is carried, the switch must not burn out and must have a reasonably long life in order for the combination to be at all usable.

Another problem that presents itself is that of insulation. Because of the breakdown in the insulation of these structures used for supporting the high voltage generating equipment, the amplitude of the voltage is limited. For voltages on the order of megavolts, resort is had to unusually large, expensive and exotically shaped insulators for supporting the high voltage generating equipment.

Finally, there is the problem of radiation. When a spark discharge generator discharges, electromagnetic waves are generated and radiated with consequent disturbance to communications equipment.

An object of this invention is to provide a novel structure for a high voltage generator.

Another object of this invention is the provision of a unique high voltage generator structure comprising the combination of the Marx surge generator and coaxial Blumlein generator.

Yet another object of the present invention is the provision of a high voltage generator structure of the type indicated which includes a durable, relatively low resistance high voltage switch.

Still another object of the present invention is the unique construction for a high voltage generator whereby high voltage insulation problems are solved in a unique manner.

Yet another object of the present invention is a high voltage generator which minimizes radiation problems.

These and other objects of this invention may be achieved by enclosing a Marx generator which drives a Blumlein coaxial line pulse generator within a shielding tank in a manner to eliminate radiation problems. The Marx generator structure as well as the Blumlein structure is suspended within a dielectric medium within the tank by insulating means such as straps of a nylon material, instead of being supported by the usual solid stand off insulating structures, whereby the problem of high voltage insulation appears to have been eliminated by this inexpensive supporting structure.

The Marx generator spark gaps are supported within an enclosed housing filled with a pressurized inert gas which provides an environment wherein rapid spark gap breakdown can occur when triggered, while minimizing any burning of the spark electrodes.

The shorting switch required for the coaxial Blumlein generator effectively comprises a portion of the Blumlein structure. At the end of the Blumlein generator adjacent the Marx generator, the central conductor is rounded and positioned adjacent to a plate which resembles a cap on the coaxial conductor surrounding the central conductor. A dielectric oil fills the space between the place and cap. When a breakdown occurs between the end cap and plate due to the voltage applied by the Marx generator the Blumlein control conductor is connected momentarily to its coaxial conductor causing a pulse to travel down the Blumlein to its other end effectively resulting in a doubled voltage at said other end. The load, which may be an electron accelerator tube, is connected between the inner conductor of the Blumlein and its outer conductor at the end opposite to the one at which the shorting switch is placed.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a circuit diagram shown to illustrate and provide a better understanding of this invention;

FIGURE 2 is a schematic diagram illustrating the layout of the Marx generator and Blumlein pulse generator in accordance with this invention;

FIGURE 4 shows the appearance of the right side of the embodiment of the invention, illustrating the relative placement of the Marx generator components;

FIGURE 5 is a view of the right side of the embodiment of the invention shown in FIGURE 3;

FIGURES 6 and 7 show capacitor support details; and

FIGURES 8 and 9 illustrate details of the construction of the Marx generator in accordance with this invention.

Figure 3:
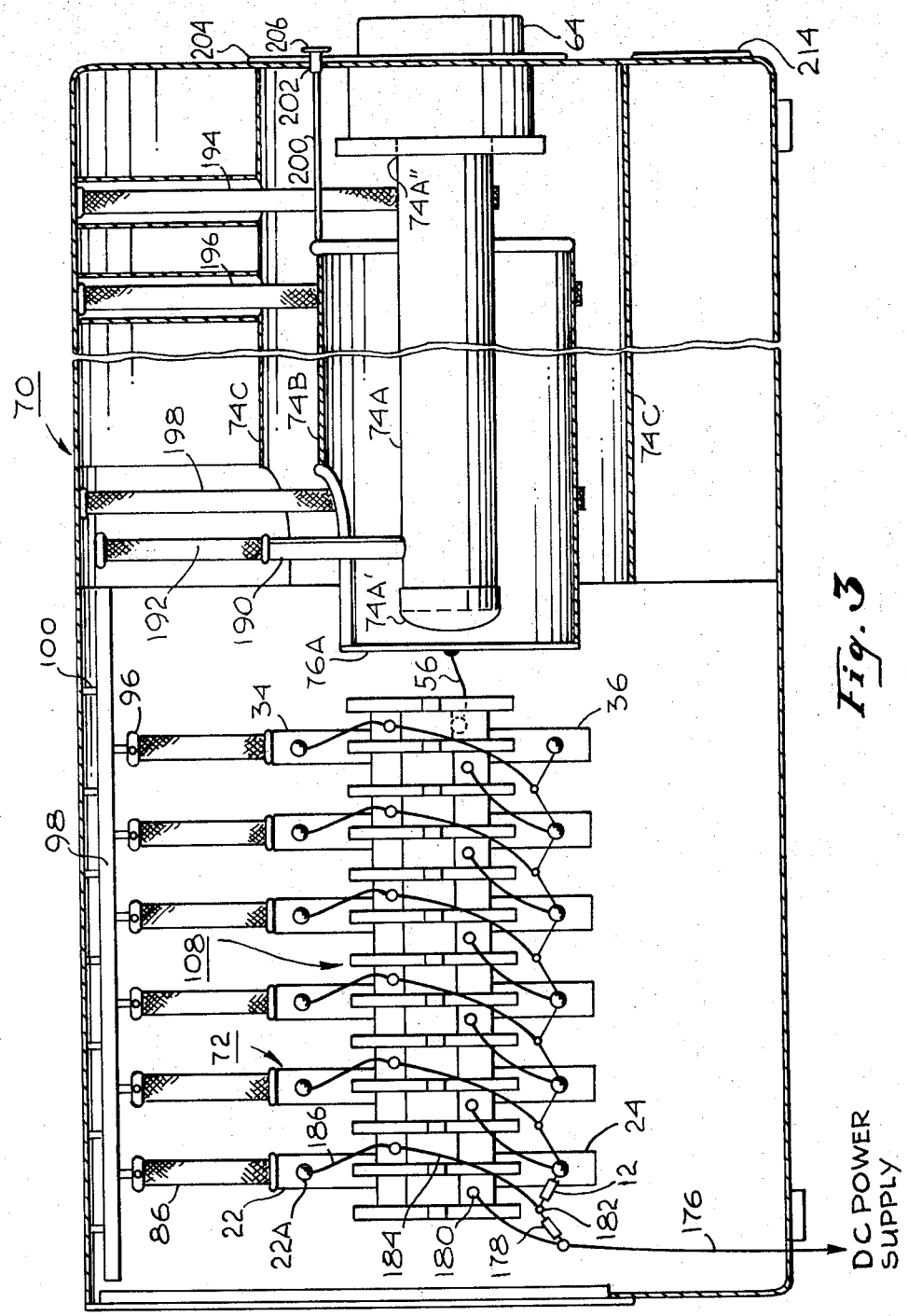
FIGURE 3 is a cross-sectional view illustrating the actual physical construction of the high voltage generator in accordance with this invention.

Referring now to FIGURE 1, there may be seen a circuit diagram of the combination of a Marx generator and Blumlein generator in accordance with this invention. A power supply 10 charges the Marx generator. The Marx generator includes a ladder-like structure wherein the sides of the ladder are serially connected individual resistors respectively 12, 12′, 14, 12′, 18, 18′ and 20, 20′. Across the series connected resistors like the rungs in the ladder are connected capacitors respectively 22, 24, 26, . . . 32, 34 and 36. Spark gaps respectively 42, 44, 50, 52 and 54, each of which comprises two spaced electrodes, are connected so that when all of these spark gaps are discharged, the respective capacitors will be connected in series. This is easily achieved by connecting one of the spark gap electrodes to one side of a capacitor and the other spark gap electrode to the other side of the succeeding capacitor. The power supply is connected across capacitor 22.

The last spark gap 54 acts as a switch and is connected to the Blumlein pulse generator through a lead which has a distributed inductance. This distributed inductance is represented by the lumped inductance 56. The Blumlein pulse generator for the purpose of the circuit diagram may be represented as two lumped capacitors 60, 62 having one side joined together and connected to the last spark gap 54 of the Marx generator, with the other sides of the capacitors 60, 62 being connected to the load 64. Another spark discharge switch 66 effectively operates to short one of the capacitors, 60, when it is discharged whereby the impedance transformation and voltage step up operation of the Blumlein pulse generator occurs. The return lines to the power supply contain distributed inductance, here represented by the lumped inductances respectively 68, 70. The lumped inductance 68 is the inductance of a return lead and the inductance 70 is the inductance of a tank which enclosed the two structures and which also serve as a ground return.

FIGURE 2 is a schematic diagram illustrating the physical layout of the apparatus in accordance with the invention. A metal tank 70, completely encloses and contains the Marx generator structure 72 and the Blumlein structure 74. The Blumlein structure 74 comprises a central conductor 74A, a first coaxial conductor 74B, which surrounds and is spaced from the central conductor 74A, and a second coaxial conductor 74C, which surrounds and is spaced from the conductor 74B. The conductor 74C is supported from the walls of the tank 70 and is conductively connected thereto. The Marx generator 72 is connected to the power supply 10 at its input side. Its output is connected to one side of a spark gap switch 76, which effectively comprises the plate or cap 76A which is placed on the end of the coaxial conductor 74B adjacent an end 74A′ of the central conductor 74A which is capped and rounded to establish a spark gap with the end plates 76A.

The end 74A′ of the inner conductor of 74A is connected to ground through the lead 68. The opposite end 74A′ of the coaxial conductor 74A is connected to a load, exemplified by the field emitter cathode 80 of an accelerator tube. The plate 82 of this tube is connected to the wall of the tank. When the last spark gap switch 54 of the Marx generator discharges, potential is applied between the plate 76 and the end 74A′ of the central conductor causing it to break down and produce a short circuit condition therebetween. In response thereto, a current pulse propagates down the line causing a phase reversal in the electric field between the central conductor and the first coaxial conductor 74B whereby the voltage therebetween adds to the voltage between conductor 74B and the outer conductor 74C to which the plate 82 is connected, causing an increase on the order of twice the voltage initially applied by the Marx generator when the spark gap switch 54 discharges just prior to the discharge of the switch established by the plate 76 and end of conductor 74A′. Since the inside of the tank 70 is filled with a dielectric oil, there is no erosion or burning away of the switch parts established by the end 74A′ and plate 76. In an embodiment of the invention which has been built and successfully operated a large number of times, no effects of such operation have been noted on the switch.

Attention is now drawn to FIGURES 3, 4 and 5 where details of the construction of the embodiment of the invention may be seen. FIGURE 3 is a cross-sectional view of an embodiment of the invention. FIGURE 4 is a view on the left side of FIGURE 3 and FIGURE 5 is a view on the right side of FIGURE 3. The structures which correspond to those described in FIGURES 1 and 2 are given the same reference numerals. As may be seen by the dotted line representation in FIGURE 4, the capacitors, for example 22, 24, are large rectangular capacitors. By way of illustration and not to be used as a limitation upon the invention, in an embodiment of the invention which was built, these capacitors were 0.5 microfarad, 125 kv. maximum working voltage sold by Aerovox Company. The capacitors are rectangular and have the high voltage type stand-off terminals respectively 22A, 22B, 24A, 24B. Each one of the upper capacitors 24 . . . 34, or the ones closest to the top of the tank, is insulatingly supported within the tank by means of two straps, such as 84, 86, of a plastic material such as nylon. Each one of the lower capacitors 24 through 36 is supported by nylon straps respectively 88, 90 which are attached to the top of the lower capacitor and the bottom of the upper capacitor.

The attachment arrangement is shown in FIGURES 6 and 7. FIGURE 6 shows front and side views of the means for attaching the nylon strap to the top or the bottom of a capacitor, and FIGURE 7 shows the arrangement for attaching nylon straps to the top of the tank. In FIGURE 6, a substantially cylindrical metal fastening member 92 is attached to the capacitor body by any suitable means such as by epoxy cement, welding, or other fasteners. The fastening member 92 has a hole therethrough through which a bolt 94 may be passed. The nylon strap 86 also has a hole therethrough which the bolt passes. A second metal fastening member 94, similar to the metal fastening member 92, has a threaded opening therethrough into which the bolt 94 is inserted and thread to clamp the nylon strap 86 against the bolt 92. One or two bolts may be employed as required for holding the capacitor 22 to the strap. A similar fastening arrangement is used for clamping the straps 88, 90 to the bottom of the capacitor 22 and for clamping the straps 88, 90 to the top of the capacitor 24.

The arrangement for holding the nylon straps, such as 84, 86, suspended from the top of the tank is shown in enlarged detail in FIGURE 7. A somewhat rectangular shaped elongated member 98 extends near the top of the tank over the region beneath which the Marx pulse generator is suspended. This member has a plurality of spaced supports 100, which are welded at one end to the top of the tank 70 and at the other end to the member 98. This member 98 also has a lower side which is open and into which there is inserted another support member 102, which is also welded to the member 98 and welded at its other end to a cylindrical rod member 104, which is similar to those rod members 92, 96, shown in FIGURE 6. The rod member 104 has a hole therethrough. The nylon strap 84 is brought up to one side of the member 104. Another cylindrical rod member 106 which has a hole therethrough is placed adjacent the nylon strap 84 with its hole aligned with the hole in the strap and the one through the rod member 104. A third rod member 108, which also has a hole therethrough is placed adjacent the nylon strap 86 to clamp it against the rod member 104. A bolt 110 is inserted through the aligned holes of the members 104, 106, 108 and the nylon straps 84, 86. A nut 112 is used to tighten up the assembly so that the straps 84, 86 are properly clamped between the rod members.

From the foregoing description, it may be concluded that the entire capacitor bank is suspended within the tank by nylon straps. It was found that the nylon provided a very high insulation resistance as well as the mechanical strength required for supporting the capacitors. The surprising feature is the fact that the nylon, for reasons which are not entirely clear, provided a much higher insulation resistance when it was given a shape either rectangular, or triangular, which had sharp corners, rather than the form of a circular cross-section or cylindrical cross-section with rounded corners. It is thought that the sharp corners prevent localized build-up of charges along the surface of the nylon strap, which occurs in the case of a cylindrical or other curved surface used for the strap.

In accordance with this invention, the spark gaps in the Marx generator are placed within a sealed or enclosed tube 108. The details of the Marx generator disclosure are shown in FIGURES 8 and 9. FIGURE 8 is a plan view of the tube, and FIGURE 9 is a view of the ball gap housing portion of the tube. It will be seen that the tube 108 is made up of alternate ball gap housing plates 114 and spacer plates 116. In addition, at spaced intervals along the tube are oversized spacers 120. The number of these is determined by the size of the tube, since a nylon strap for example, 122, 124 is passed around these for supporting the tube within the tank.

The cross-sectional area of spacers and the ball gap housing as well as the oversized spacer is substantially the same. The outer surface effectively comprises a rectangle with its corners cut off, and the center is substantially a hollow circle. End caps 126, 128 are placed at both ends of the tube in order to close it off. The number of sections required for a tube is determined by the number of pairs of ball gaps which is in turn determined by the design parameters of the Marx generator required to produce a predetermined voltage pulse. Once the successive spacers and ball gap housings are assembled in aligned form and the end caps are placed in position, the entire assembly is held in air tight form by using four rods 130, 132, 134, only three of which are shown, which are threaded at one end into the end cap 128 and are clamped at the other end by nuts 136, 138, 140, which are screwed down tightly onto the end cap 126.

In FIGURE 9, there may be seen the details of the ball gap housing. Each ball gap housing contains two ball gap electrodes respectively 142, 144, which are supported opposite to one another on stand-off conductive rods 146, 148. It should be noted that the positioning of the ball gap electrodes in adjacent sections is alternate, as represented by the dotted ball gap electrode 150, 152 shown in FIGURE 9. The respective posts 16, 148 on which the ball gap electrodes 142 and 144 are threaded extend through suitable openings in the ball gap housing 114. The diameters of the portions extending through the ball gap housing are reduced and provision is made for an O-ring 154, 156, for sealing this opening against gas leakage. The outside end of each ball gap support post is threaded into a conductive nut 160, 162. These conductive nuts have two openings therethrough respectively 164, 166, into which there may be inserted and welded a lead 168 on which is supported a resistor bracket 170. There is one lead which extends to a resistor bracket 170 into which are inserted the ends of resistors 172, 174, which lead to the succeeding ball gap. Another lead and bracket (not shown) is inserted into the opening 164 to connect to the resistor fixture into which the ends of resistors are inserted, which have their other ends connected to the preceding ball gap arrangement.

The resistor fixture resembles fuse clips into which the ends of the resistors are inserted. The arrangement for anchoring the nylon straps which support the ball gap enclosure tube 108 is the same as the one shown for suspending the capacitors to the top of the tank. This may be seen in FIGURE 4. In FIGURE 3, the arrangement for the interconnection of the resistors with the capacitors and ball gaps is shown. A lead 176 which extends to the power supply is connected to one of the resistors 178, and also to the first ball support nut 180. The resistor 178 connects to the resistor assembly 182 to which a second resistor 12 is connected. The resistor bracket 182 is also connected by a lead 184 to the ball support nut 186. The ball support nut 186 is connected by a lead 186 to a terminal of the capacitor 22. Other leads (not shown), interconnect the resistors, ball gaps and capacitors in the manner schematically shown in FIGURE 1.

The lead 56 connects the last spark gap of the Marx pulse generator to the plate 76A. This plate serves as a cap over the end of the coaxial conductor 74B. The Blumlein coaxial pulse generator, like the Marx pulse generator, is suspended within the tank by nylon straps. Thus, a conductive rod 190 connects to the central conductor 74A for the purpose of enabling it to be connected by means of a conductor, not shown here, to ground. The conductive rod 190 at its top is attacked by any suitable means to a nylon strap 192, the other end of which is attached to the tank wall. Another nylon strap 194 makes a loop within which the end 74A' of the central conductor is carried. The other end of the nylon strap 194 is also attached to the tank wall. The outer conductor 74B is supported between two or more slings made of nylon straps respectively 196, 198 which form loops within which the outer conductor 74B rests. This enables the distance between the plate 76A and the cap 74A' to be adjusted easily. A rod 200 has one end attached to the first outer conductor 74B and the other end is threaded and engages a threaded bushing 202, which is made of insulating material, and is clamped in the end plate 204 of the tank. By turning the knob 206, the threaded rod can push or pull the first outer conductor 74B so that the plate 76A is closer to or farther from the end cap 74A'.

The entire tank is filled with a dielectric oil which covers both the Blumlein and Marx pulse generators. As previously indicated, when the Marx generator discharges, it causes a discharge between the plate 76A and the end cap 74A' which effectively operates to reverse the electric field of the voltage established between the first outer conductor 74B and the central conductor 74A at the end opposite to the one at which the shorting discharge occurs. The length of the first outer conductor 74B is made one-half the length of the wavelength of the discharge pulse. The spark discharge between the plate 76A and cap 74A occurs in the oil which apparently has the effect of preserving the switch against destruction by arcing.

As may be seen in FIGURES 4 and 5, the ends of the tank are sealed. In FIGURE 4 there are wing nuts 210 which clamp tight the door 212. In FIGURE 5, the end plate 204 is bolted tight to the opening in the end of the tank. However it does have provision for installation of the tube 64. Another access port 214 is provided at the bottom of the tank on the right side. The tank may be supported on rollers 216, 218 which roll in tracks 220, 224.

It should be pointed out that a novel construction described for supporting the Marx pulse generator and Blumlein pulse generator within the tank effectively hanging them by nylon straps, provides a most inexpensive insulating supporting arrangement. The switch used for shorting the Blumlein is a most inexpensive and simple device which operates repetitively, in view of the fact that the dielectric oil is present, to maintain the metal at a temperature caused by arc discharges. The Marx generator construction provides for longevity because the gas mixture is extremely inert, and consequently no by products (such as nitric acid which occurs in the usual Marx generator where the atmosphere is nitrogen) are caused by the arc discharges. Furthermore, the gas mixture employed permits the spacing of the Marx generator ball gaps, in the manner disclosed herebefore, to establish a capacitor having a capacitance value smaller than that of the discharge capacitors which consequently enables the substantially simultaneous triggering of the discharge without the use of ultraviolet light, as is required to cause triggering of other Marx generators using nitrogen.

There has accordingly been described and shown herein a novel, useful and relatively inexpensive system for generating high pulse voltages.

What is claimed is:

1. A high voltage pulse supply system comprising in combination a Marx pulse generator, a Blumlein pulse generator coupled to said Marx pulse generator to be driven thereby, a hollow conductive enclosure, and flexible insulating plastic strap means for supporting said Marx pulse generator and Blumlein pulse generator within said hollow conductive enclosure.

2. A voltage pulse supply as recited in claim 1 wherein said flexible insulating plastic strap means is made of nylon.

3. Apparatus as recited in claim 1 wherein said enclosure is filled with a dielectric oil, said Blumlein pulse generator comprises a central conductor, a first coaxial conductor surrounding said central conductor, and a second coaxial conductor surrounding said first coaxial conductor, and switch means for shorting said first coaxial conductor to one end of said central conductor responsive to a high voltage pulse received from said Marx pulse generator.

4. A high voltage pulse generator as recited in claim 3 wherein said switch means for shorting said first coaxial conductor to one end of said central conductor comprises a plate covering one end of said first coaxial conductor which is adjacent said one end of said central conductor, means for adjusting the spacing between said plate and said one end of said central conductor, a plurality of capacitors in said Marx generator, means for connecting said plurality of capacitors in series for establishing a high voltage pulse across said series connected capacitors, means connecting one end of said series connected capacitors to said plate, and means connecting the other end of said series connected capacitors to said one end of said central conductor.

5. Apparatus as recited in claim 1 wherein said Marx generator includes a plurality of capacitors, means for charging said plurality of capacitors in parallel, ball gap switch means for connecting said charged capacitors in series, said ball gap switch means including a hollow enclosure having walls made of insulating material, said ball gap switch means including a first and second ball, a first and second post respectively supporting said first and second ball spaced apart from one another within said enclosure, said first and second post extending through said enclosure wall, and inert gas means within said enclosure.

6. Apparatus as recited in claim 5 wherein said inert gas means comprises a mixture of $CO_2$ and argon.

7. A high voltage pulse generator comprising a Marx pulse generator including a plurality of capacitors, means for charging said plurality of capacitors in parallel, means for connecting said plurality of charged capacitors in series for establishing a high voltage pulse thereacross, a Blumlein pulse generator, said Blumlein pulse generator including a central conductor, a first coaxial conductor surrounding said central conductor and a second coaxial conductor surrounding said first coaxial conductor, means connecting one end of said first coaxial conductor to one end of said serially connected capacitors, and means connecting one end of said central conductor adjacent said one end of said first coaxial conductor to said other end of said serially connected capacitor means.

8. Apparatus as recited in claim 7 wherein said means connecting said one end of said serially connected capacitors to said one end of said first coaxial conductor includes a conductive plate connected to said one end of said coaxial conductor, said conductive plate being positioned adjacent to said one end of said central conductor, and a dielectric oil filling the space between said plate and said one end of said central conductor.

9. Apparatus as recited in claim 8 wherein there is included a hollow metal enclosure, and means for insulatingly hanging said Marx pulse generator and said Blumlein pulse generator within said hollow metal enclosure.

10. In a Marx generator of the type comprising a plurality of capacitors, means for charging said capacitors in parallel, and spark gap means for connecting said plurality of capacitors after they are charged in series, the improvement in said spark gap means comprising a substantially cylindrical enclosure having walls made of insulating material, a plurality of spark gap switches positioned within said enclosure, each spark gap switch comprising first and second cylindrical electrode means spacing said cylindrical electrodes from each other a distance to establish a capacitance therebetween smaller than the value of capacitance from one of said capacitors, and means for filling said enclosure with carbon dioxide and argon under pressure.

11. Apparatus as recited in claim 10 wherein there is included a conductive housing, and means for insulatingly supporting said capacitors and said cylindrical enclosure within said conductive housing, said means for insulatingly supporting said capacitors and said tubular housing within said conductive housing comprising a plurality of nylon straps having one end attached to the walls of said structures.

12. In combination, a conductive enclosure, high voltage generating equipment within said enclosure, and means for insulatingly supporting said high voltage generating equipment within said enclosure comprising nylon straps supporting said high voltage equipment from said enclosure walls, said nylon straps having a cross-sectional area with at least one edge.

References Cited

UNITED STATES PATENTS

| 2,243,941 | 6/1941 | Bouwers | 321—15 |
| 2,404,799 | 7/1946 | Harry et al. | 174—17 |
| 3,048,766 | 8/1962 | Panzer | 321—15 |
| 3,159,769 | 12/1964 | Parrish | 174—52 X |

JAMES W. MOFFITT, Primary Examiner

JOSEPH F. BREIMAYER, Assistant Examiner

U.S. Cl. X.R.

307—108; 174—35, 137, 50.54; 321—15